Sept. 11, 1951    J. B. CAMP    2,567,422
SHEET COUNTER
Filed Jan. 8, 1948    8 Sheets-Sheet 1
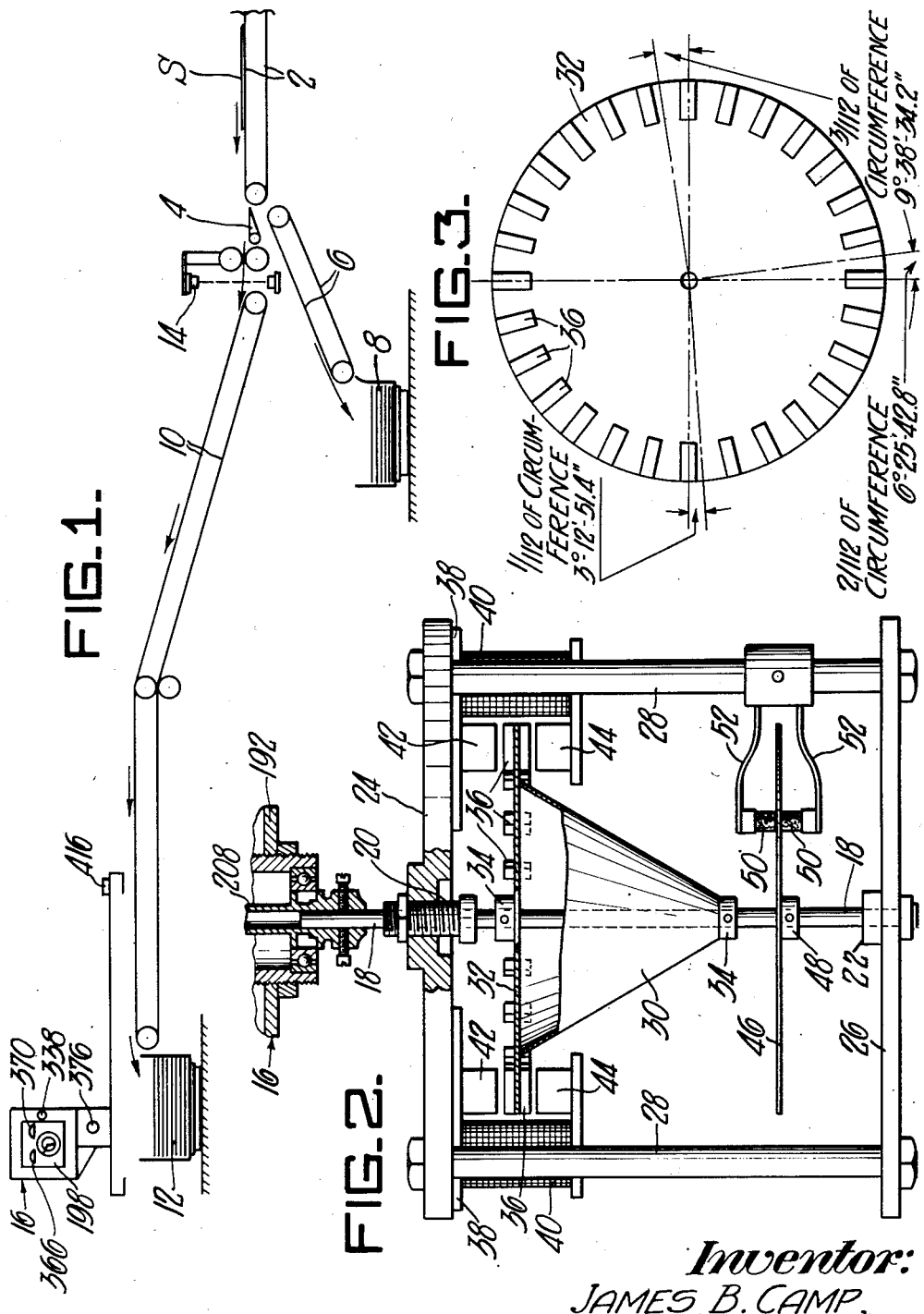
Inventor:
JAMES B. CAMP
by: Donald G. Dalton
his Attorney.

Sept. 11, 1951  J. B. CAMP  2,567,422
SHEET COUNTER
Filed Jan. 8, 1948  8 Sheets-Sheet 2
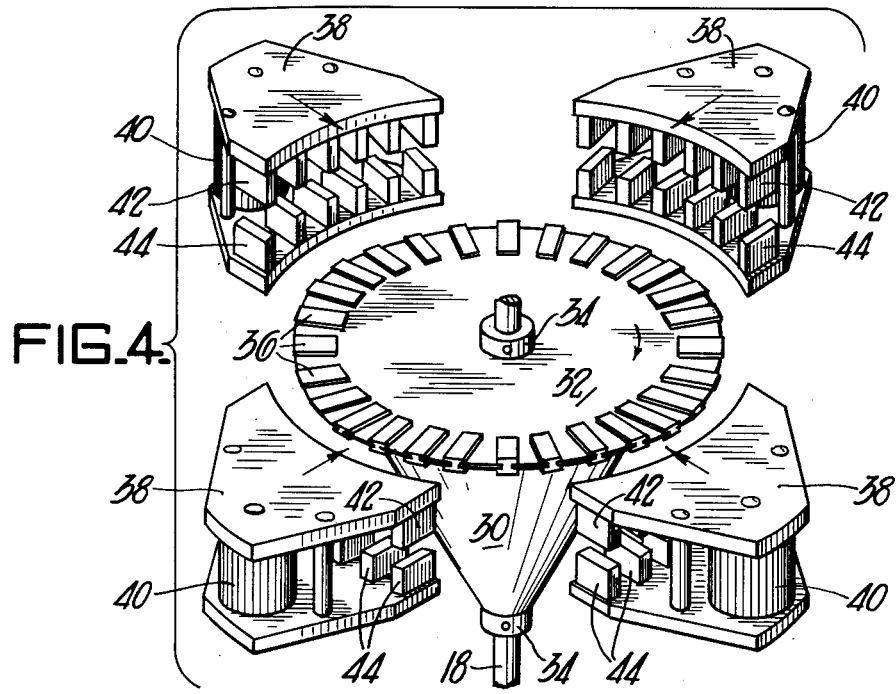
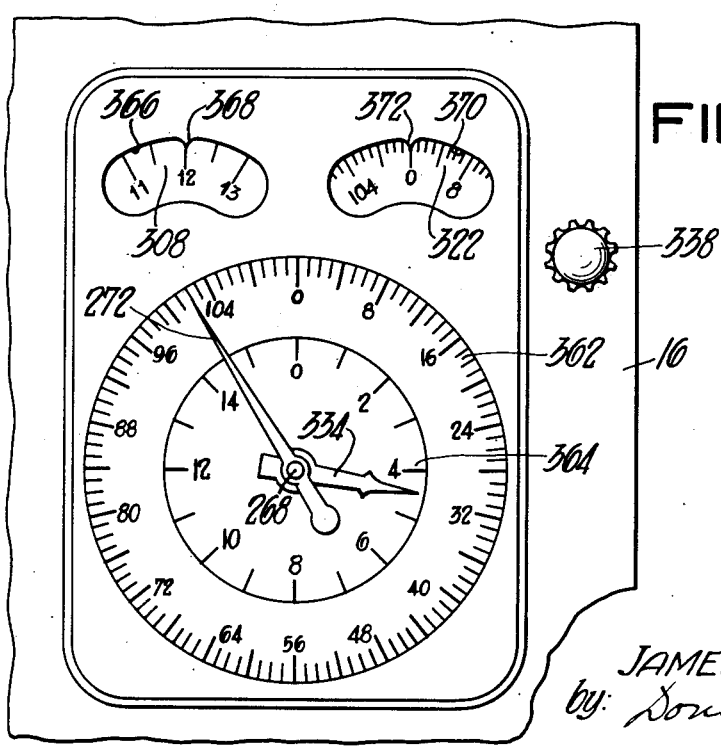
Inventor:
JAMES B. CAMP,
by: Donald G. Dalton
his Attorney.

Sept. 11, 1951  J. B. CAMP  2,567,422
SHEET COUNTER
Filed Jan. 8, 1948  8 Sheets-Sheet 3
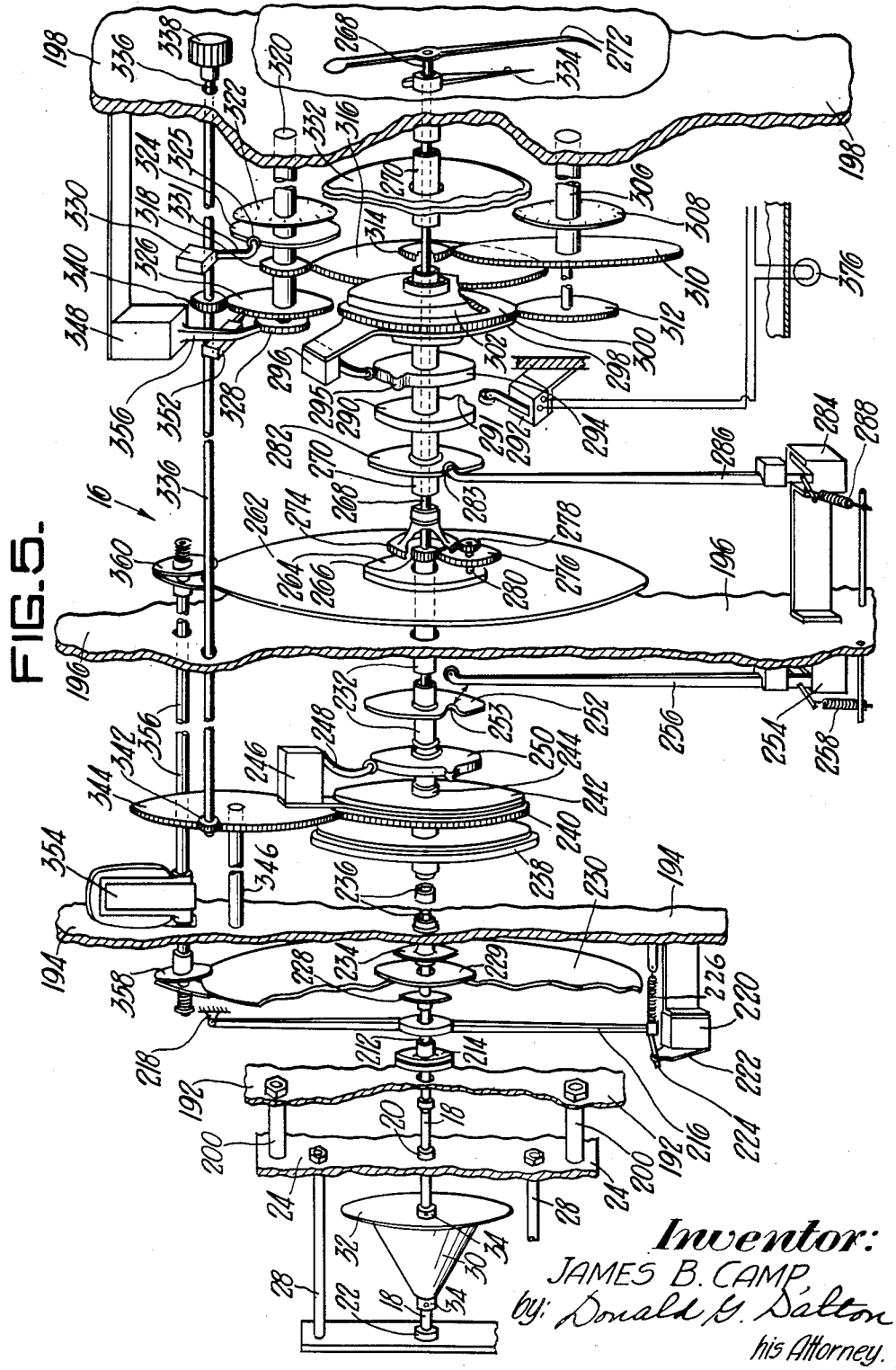
Inventor:
JAMES B. CAMP,
by: Donald G. Dalton
his Attorney.

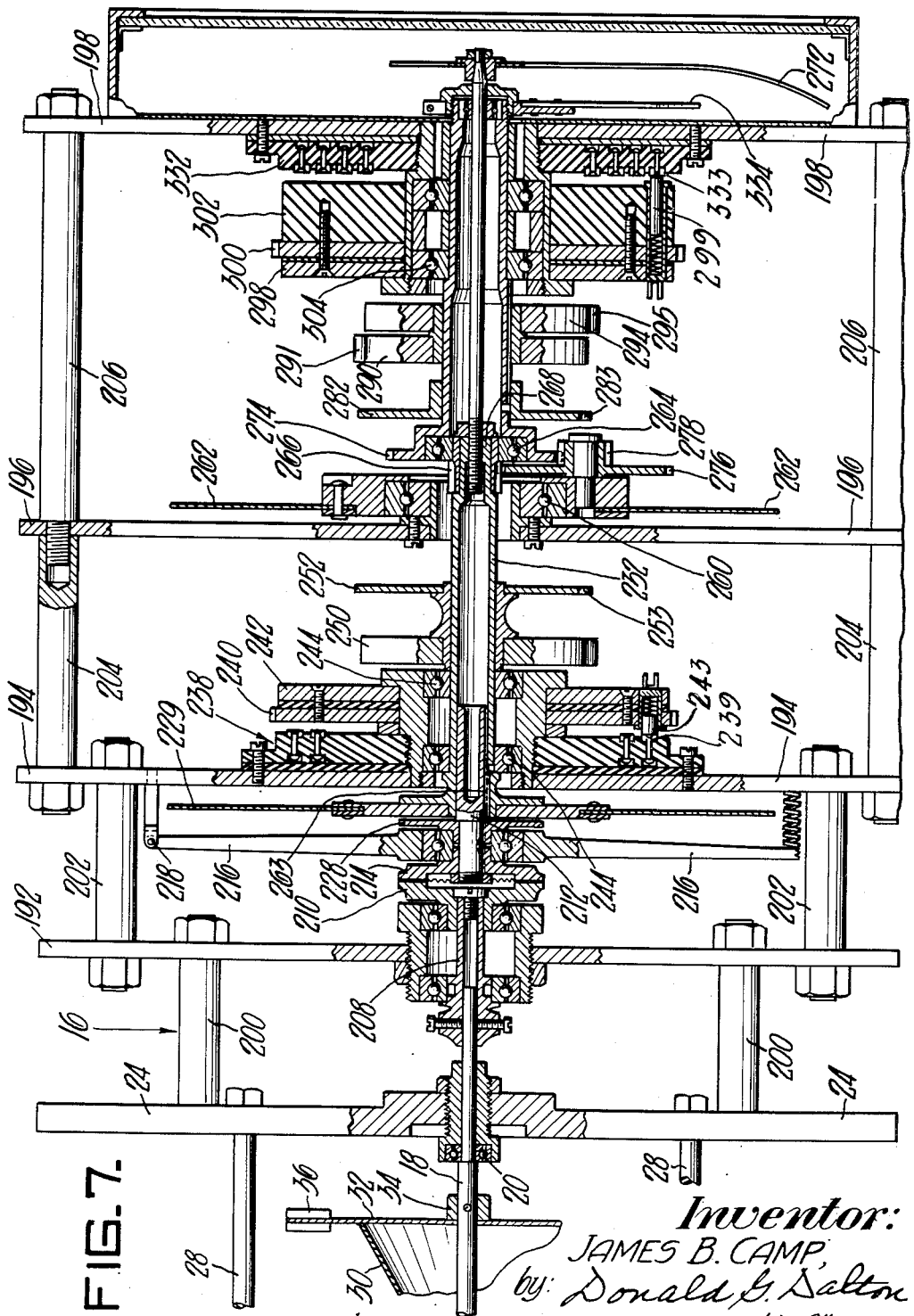

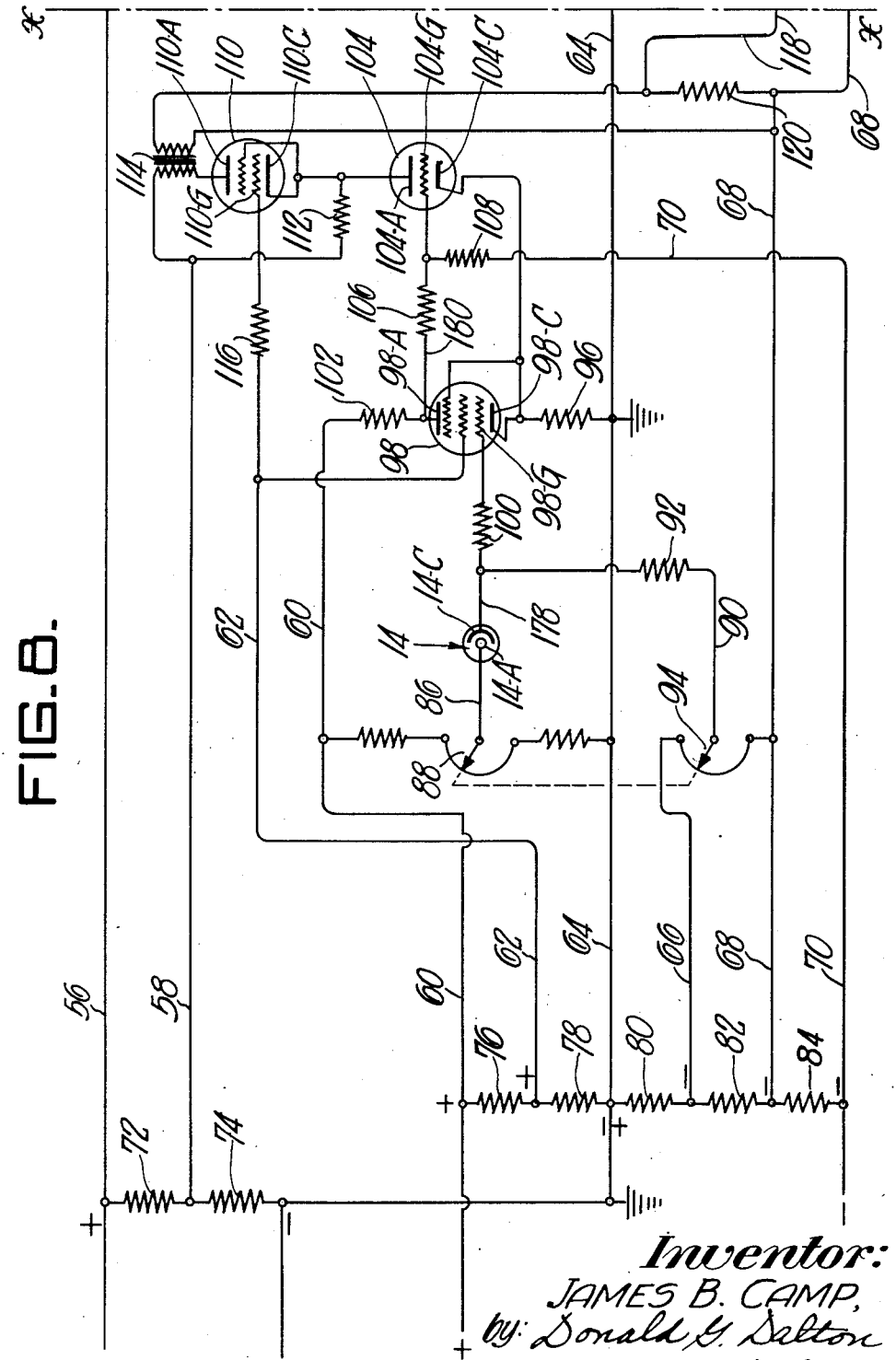

Sept. 11, 1951
J. B. CAMP
2,567,422
SHEET COUNTER
Filed Jan. 8, 1948
8 Sheets-Sheet 6
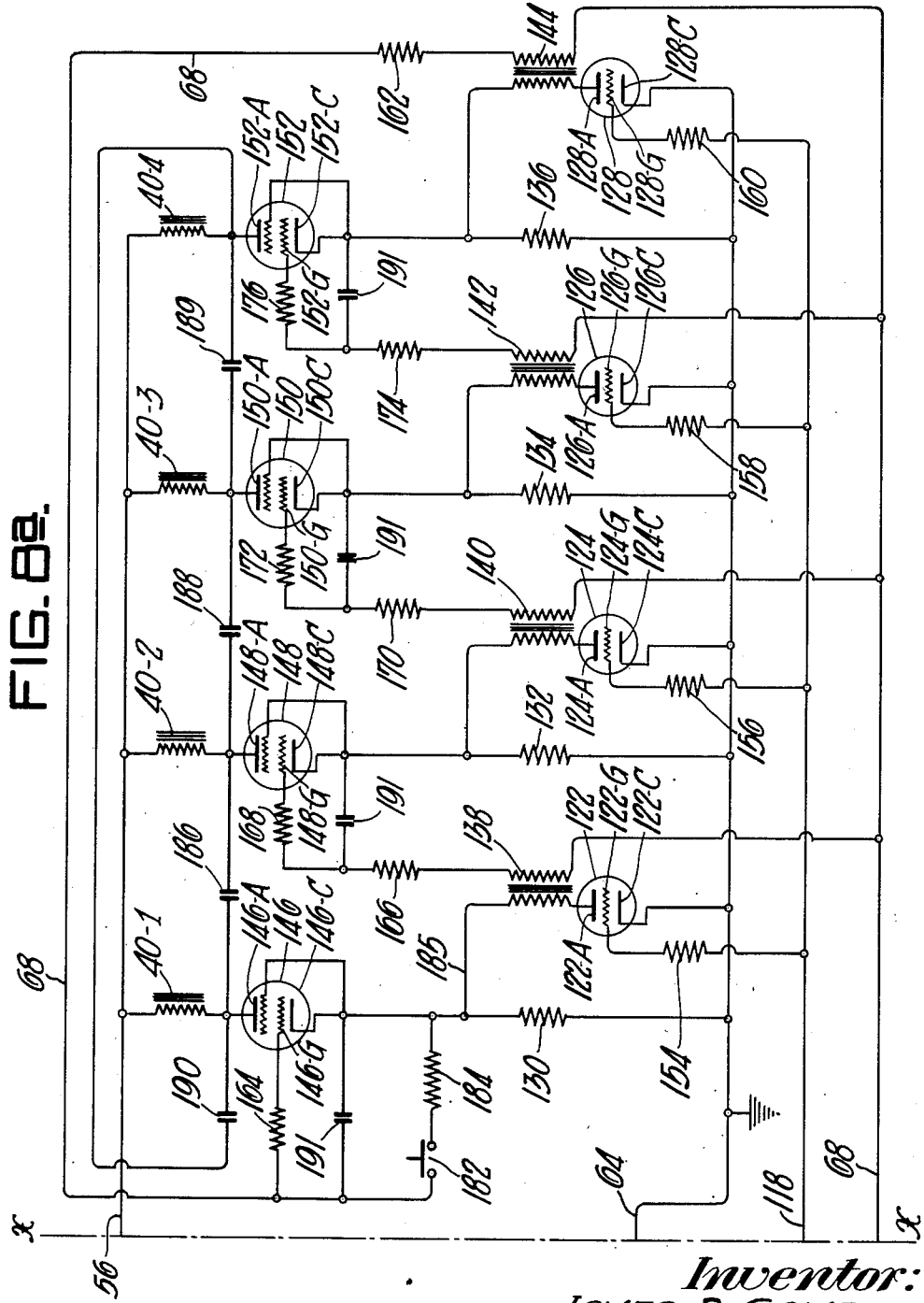
Inventor:
JAMES B. CAMP,
by: Donald G. Dalton
his Attorney.

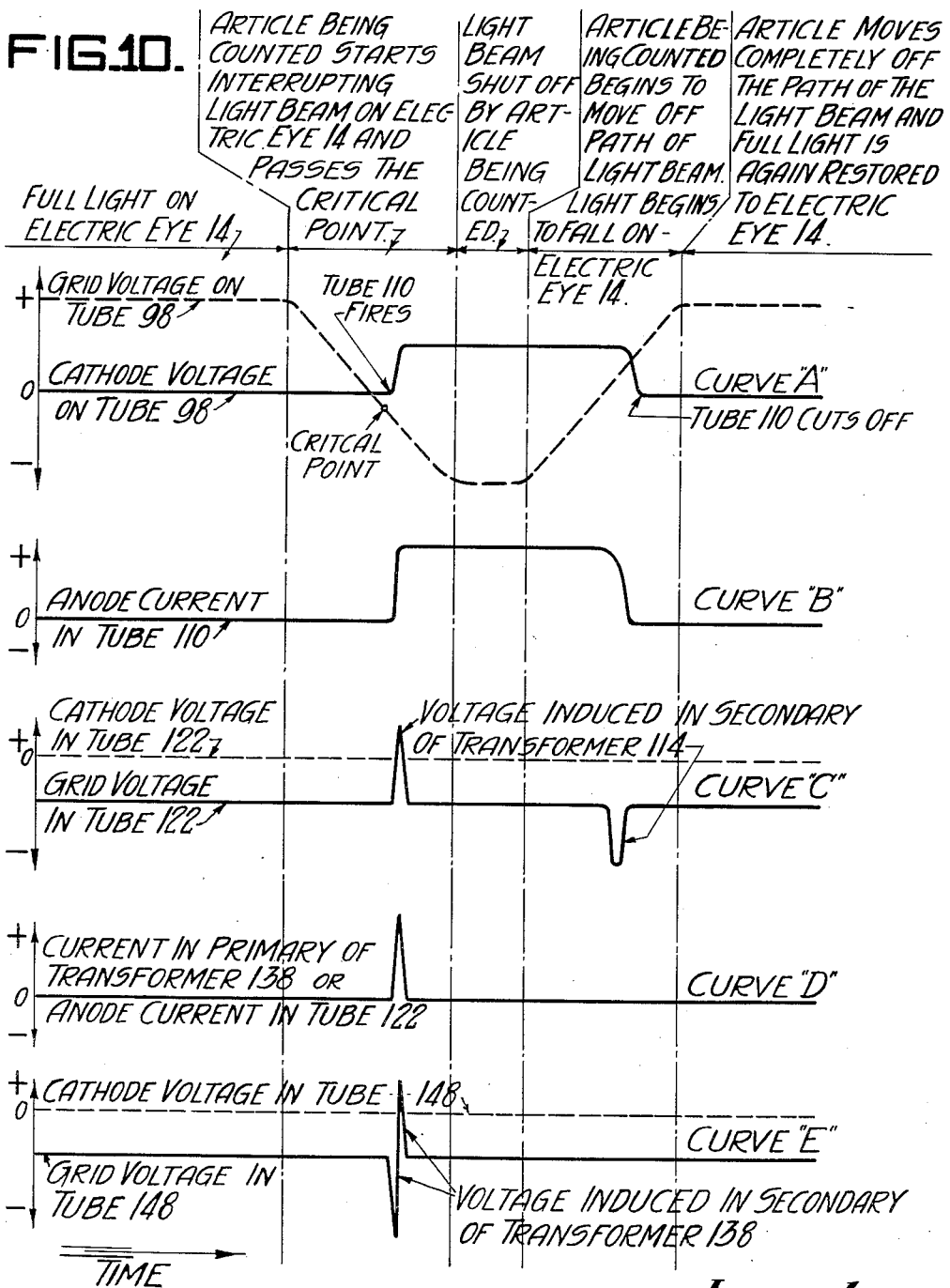

Patented Sept. 11, 1951

2,567,422

UNITED STATES PATENT OFFICE 2,567,422

SHEET COUNTER

James B. Camp, Fairfield, Ala., assignor to Tennessee Coal, Iron and Railroad Company, a corporation of Alabama Application January 8, 1948, Serial No. 1,230

6 Claims. (Cl. 235—98)

This invention relates to sheet counting mechanism and more particularly to such mechanism for counting sheets of tin plate as they move along a conveyor. Apparatus heretofore used in counting sheets and other articles have been deficient in that it has been practically impossible to count the articles at high speeds with accuracy. In addition, in mechanism for counting sheets of tin plate on a moving conveyor, it is necessary to count a predetermined number of sheets to make a bundle. Previously, in counting bundles of sheets it was necessary to manually reset the counter after the completion of the counting of the sheets. This, of course, provided another source of error since the operator might possibly fail to reset the counter before the sheet count had started. Also, in this process sheets are added or subtracted from the conveyor in that part of the conveyor beyond the counter. Previously, it was necessary for the operator to remember exactly how many sheets were added or subtracted and to correct the final count. In the counters formerly used for counting sheets, the upkeep was considerable and the life of the counters was short.

It is, therefore, an object of this invention to provide a counter which is able to count sheets moving at high and variable speeds.

Another object is to provide a counter which will reset itself after the completion of the count of a predetermined number of articles.

Still another object is to provide a counter having means for correcting for the removal or addition of articles during operation.

A further object is to provide a step-by-step motor peculiarly adapted for use in the counter.

A still further object is to provide a time-delay relay for use with my counter in which the time-delay varies inversely as the speed of the conveyor.

These and other objects will be more apparent after referring to the following specification and attached drawings, in which:

Figure 1 is a schematic diagram of the sheet conveyor system with the counter incorporated therein;

Figure 2 is a view, partly in section, of the step-by-step motor;

Figure 3 is a plan view of the rotor disc of the motor showing the arrangement of the poles around the periphery thereof;

Figure 4 is an exploded perspective view of the rotor and stators of the motor of Figure 2;

Figure 5 is a schematic perspective view of the counting mechanism with parts removed for clarity;

Figure 6 is a top plan view of the counting mechanism of Figure 5;

Figure 7 is a sectional view of the counting mechanism of Figure 5 with certain parts omitted for the purpose of clarity;

Figure 9:
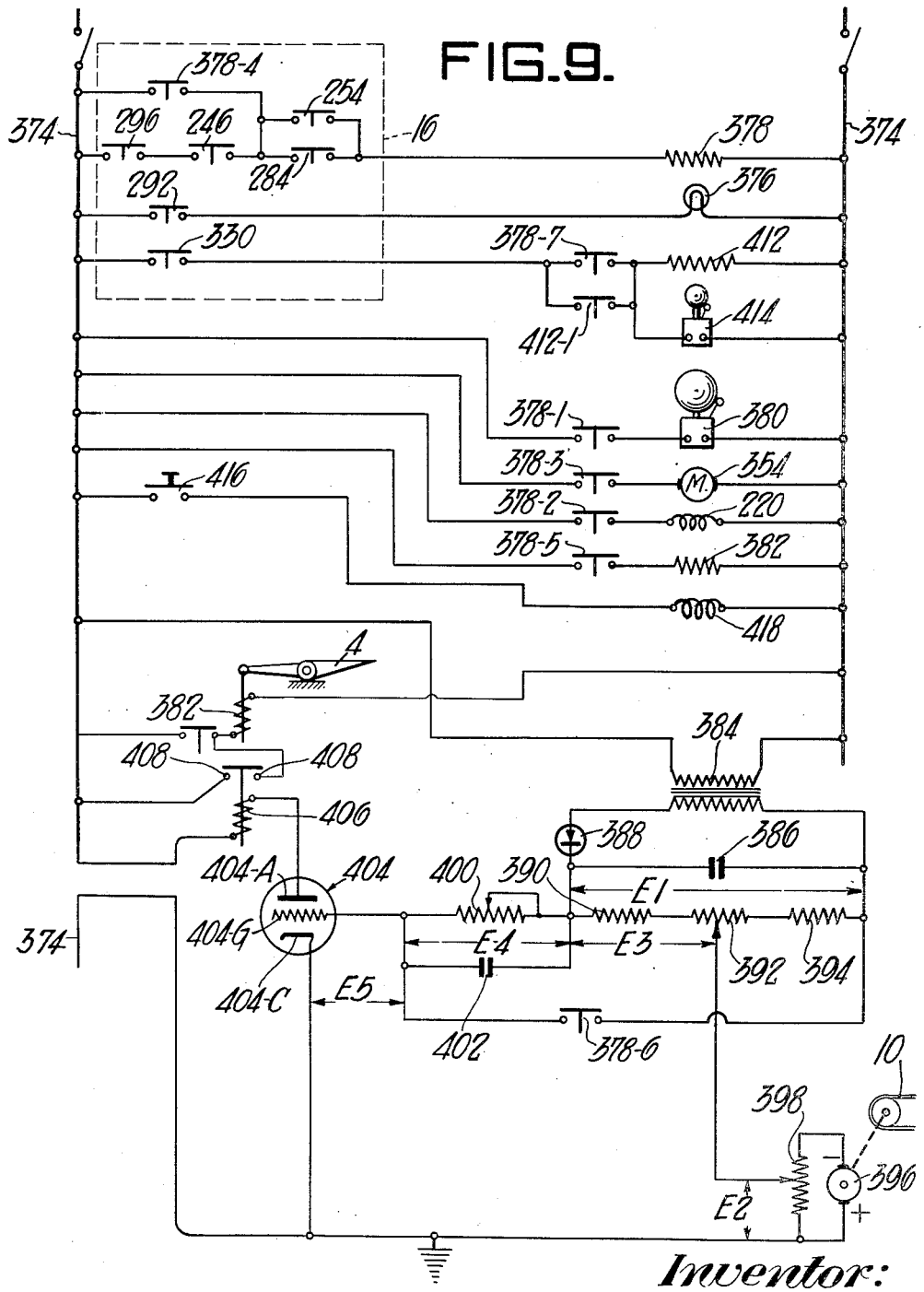

Figures 8 and 8a, when connected on the line X—X, show a schematic wiring diagram of the circuit for supplying impulses to the stator coils;

Figure 9 is a schematic wiring diagram showing the time-delay relay and the circuits controlled by the mechanism of Figures 5–7; and Figure 10 shows a number of curves illustrating the operating characteristics of certain tubes and transformers in the circuit of Figures 8 and 8a.

Referring more particularly to Figure 1 of the drawings the reference numeral 2 indicates a conveyor along which the sheets S travel on their way from a shear. At the end of the conveyor 2 is a flap gate 4 which directs the sheets S either to the conveyor 6 which leads to the mender piler 8 or to the inspection conveyor 10 which leads to the prime piler 12. An electric eye 14 is located in the path of travel of the sheets S to the prime piler 12. As the sheet passes under the electric eye 14, light thereto is cut off and the number of sheets on the indicating unit 16 is increased by one in a manner to be described hereinafter. While the invention is not limited to the counting of sheets it will be described herein as relating to a sheet piler in which sheets of tin plate are arranged in a bundle of twelve packages with each package unit consisting of one hundred and twelve sheets.

The step-by-step motor of my invention is best shown in Figures 2, 3 and 4. The motor has a rotor shaft 18 which is mounted in bearings 20 and 22 in the stator plate 24 and bearing plate 26, respectively. Plates 24 and 26 are connected by means of spacer bolts 28. Mounted on the shaft 18 between plates 24 and 26 are the rotor cone 30 and attached rotor disc 32 which are made from aluminum or any non-magnetic metal, the disc being of greater diameter than the base of the cone. The disc and cone are held in position on the shaft for rotation therewith by means of pins passing through the hubs 34. Mounted around the periphery of the disc 32 are twenty-eight equally spaced rotor poles 36. Supported on the stator plate 24 are four stator pole segments 38, each segment consisting of a coil 40, six equally spaced upper poles 42 and six lower poles 44 spaced directly beneath the upper poles. The rotor poles 36 are located between the poles 42 and 44. The four pole segments 38 are grouped around the periphery of the rotor 32 so as to create a vernier effect between the pole segments of the stator and those of the rotor. As shown in Figure 3, the center line of the second stator plate is 90°+1/112 of the circumference from the center line of the first stator plate. The center line of the third stator segment is the same distance from the center line of the second stator segment and the center line of the fourth stator segment is likewise the same distance from the center line of the third stator segment. Mounted below the cone 30 is a drag plate 46 which is fastened to the shaft 18 by means of a set screw passing through the drag plate hub 48. Braking action is supplied to the drag plate 46 by means of two fixed spring pressed felt brushes 50, one on each side of the plate. The springs 52 are supported on a hub 54 which is mounted on one of the bolts 28. When the first coil 40—1 is energized, its poles are magnetized, thus attracting the six nearest rotor poles 1 to 6, inclusive, measured around the periphery, so that the rotor is held in a fixed position with these six poles opposite the poles of the first stator coil segment. When the second coil 40—2 is energized and the remaining coils deenergized, the poles of coils 40—2 attract the six nearest rotor poles (8 to 13 inclusive), thus rotating the rotor shaft 1/112 of a complete revolution. Coil 40—3 is next energized and with the other coils deenergized, the six nearest rotor poles (14 to 19, inclusive) are brought into alignment with the poles of coil 40—3, this likewise resulting in rotation of rotor shaft 1/112 of a complete revolution. Coil 40—4 is next energized with the remaining coils being deenergized. This brings the nearest rotor poles (21 to 26 inclusive) into alignment with the poles of coil 40—4 and rotates the shaft 18 through another 1/112 of a revolution. This operation is repeated each time a sheet passes under the electric eye 14 with the poles of the energized coil attracting the rotor poles nearest thereto.

The control for carrying the impulses from the electric eye 14 into the coils 40 is best shown in Figures 8 and 8A. D. C. voltage is applied to the lines 56, 58, 60, 62, 64, 66, 68 and 70 from any suitable source. Line 64 is at ground potential while lines 56, 58, 60 and 62 have a positive potential with the lower numbered lines having a higher potential than the next succeeding higher numbered line. Lines 66, 68 and 70 have a negative potential with the higher numbered lines having the greater negative potential. The value of the voltage supplied to these lines is determined by means of the voltage dividers 72, 74, 76, 78, 80, 82 and 84, respectively. When voltage is applied to the lines 56 to 70, inclusive, with no light on tube 14, and the filaments of all the tubes turned off so that none of the tubes pass current, the static conditions of the circuit is as follows: The anode 14A of the electric eye of photoelectric cell 14 will receive a positive voltage 86 which is variable with respect to ground by means of the potentiometer 88. The cathode 14C has a negative voltage 90 to the voltage divider 92. Voltage 90 is also variable with respect to ground by means of the potentiometer 94. Potentiometers 88 and 94 are mechanically connected as shown so that when the potentiometers are varied the voltages 86 and 90 will increase or decrease the same amounts. Connected to line 64 through a variable resistance 96 is the cathode 98C of a vacuum tube 98 which is at ground potential. The control grid 98G has negative potential 90 through resistances 92 and 100. The anode 98A has a positive voltage 60 through resistance 102. The cathode 104C of vacuum tube 104 is at ground potential through resistance 96. The control grid 104G is positive from line 60 through resistances 102 and 106, but is less positive than line 60 due to the voltage divider circuit 60, resistances 102, 106 and 108 to line 70. The anode 104A is connected to the cathode 110C of a thyratron tube 110 and also to line 58 through a resistance 112. The anode 110A has the same positive potential as cathode 110C since it is connected to the line 58 through the primary of a transformer 114. Control grid 110G is connected to line 62 through a resistance 116. Thus the anode 110A and the cathode 110C have a positive potential with respect to the grid 110G. A line 118 is connected to line 68 through the secondary of transformer 114 in parallel with a resistance 120. The cathodes 122C, 124C, 126C and 128C of vacuum tubes 122, 124, 126 and 128 are at ground potential since they are connected to the line 64. The anodes 122A, 124A, 126A and 128A are also at ground potential through resistances 130, 132, 134 and 136, respectively, and the primary of transformers 138, 140, 142 and 144, respectively. Connected to the coils 40—1, 40—2, 40—3 and 40—4 are thyratron tubes 146, 148, 150 and 152, respectively. The cathodes 146C, 148C, 150C and 152C are at ground potential since they are connected to line 64 through resistances 130, 132, 134 and 136, respectively. Anodes 146A, 148A, 150A and 152A are at positive potential 56 through the fields 40—1, 40—2, 40—3 and 40—4, respectively. Control grids 122G, 124G, 126G and 128G are at negative potential 118 through resistances 154, 156, 158 and 160, respectively. Control grid 146G is at negative potential 68 through the secondary of a transformer 144, resistance 162 and resistance 164. The control grid 148G is also at negative potential 68 through the secondary of transformer 138, resistances 166 and 168. The control grid 150G is at negative potential 68 through the secondary of transformer 140, and resistances 170 and 172. The control grid 152G is at negative potential 68 through the secondary of transformer 142 and resistances 174 and 176.

Assuming that light is allowed to strike the photoelectric cell tube 14 and the filaments of all the tubes are energized, the conditions throughout the circuit will be as follows. The light on photo-tube 14 causes its resistance to decrease to a value that is small compared to that of resistor 92. This, therefore causes the voltage at 178 to approach positive voltage 86 so that the grid 98G becomes positive through resistance 100. Since the grid 98G is positive with respect to the cathode 98C and the anode 98A is positive, the tube 98 passes current. The resulting current flow through resistance 102 causes a voltage drop which makes the voltage at 180 and consequently the control grid 104G negative with respect to the cathode 104C. Therefore, tube 104 does not conduct current and since tube 110 is in series with tube 104, it cannot conduct. The control grid 110G is negative with respect to cathode 110C. Since no current flows in the primary of transformer 114 no voltage is induced in the secondary thereof. Thus no change takes place throughout the rest of the circuit. In order to prepare the counter for operation, the normally open spring return switch 182 is momentarily closed, this connecting the grid 146G to the cathode 146C through a resistance 184 to remove the negative bias. The tube 146 having no bias on its control grid 146G will conduct, thereby causing a flow of current from ground through resistance 130, tube 146 and coil 40—1 to line 56. This energizes the motor stator coil 40—1 causing it to attract the nearest rotor poles in the manner described hereinbefore. A negative bias is returned to the grid 146G when switch 182 is opened, but since tube 146 is of the thyratron type, its grid has no further control over it once it starts conducting and therefore the tube continues to conduct even with the switch 182 open. Current flowing through resistance 130 causes a voltage drop thereacross so that the voltage at 185 becomes positive with respect to ground. This in turn causes the anode 122A to become positive since it is connected to line 185 through the primary of transformer 138. However, tube 122 cannot conduct due to the negative bias on its grid 122G and therefore nothing happens in the secondary of the transformer 138. The voltage drop between the anode 146A and cathode 146C is very low so that the two voltages are substantially equal. The voltage at 146A is negative with respect to line 56 by the amount of the RI drop in coil 40—1. Since tube 148 is not conducting, the voltage at 148A is equal to the voltage 56, thus a condenser 186 connected between anodes 146A and 148A will become charged due to the potential difference between these two points with the side of the condenser connected to 146A having a negative charge and the side connected to 148A having a positive charge.

When sheet S starts to interrupt the light beam on the photoelectric cell 14, the resistance of the photocell increases thereby decreasing the voltage drop across resistance 92. This causes the grid 98G to become more negative with respect to its cathode 98C so that there is a small decrease in current through the tube 98. This, in turn, causes a decrease in voltage drop across resistance 102 which makes the control grid 104G slightly more positive so that the tube 104 starts to conduct and draw current through resistance 112. This makes cathode 110C less positive with respect to ground and since the bias voltage on the control grid 110G remains fixed, the control grid becomes more positive with respect to the cathode 110C. At this time tube 104 is just beginning to conduct and tube 98 is beginning to cease conducting. The current through resistance 96 is very small due to the fact that the resistance values of resistances 102 and 112 are very high. The resistance of resistance 96 is low so that the voltage drop thereacross is small since the current is small. Therefore, the cathodes 98C and 104C are at ground potential for practical purposes. This is shown in Figure 10, curve A. As the sheet cuts more of the light beam on tube 14 and grid 98G becomes more negative, more current flows through tube 104 and through resistor 112. The IR drop across resistor 112 will therefore increase, resulting in: (1) an increased difference in the potential between anode 110A and cathode 110C and (2) a decrease in the positive potential of cathode 110C. Since the grid voltage remains fixed the grid becomes less negative with respect to the cathode. As more light is cut off, the IR drop across resistor 112 continues to increase with a corresponding change in results (1) and (2) mentioned above until tube 110 suddenly starts to conduct. When tube 110 fires its grid has no further control on the operation of the tube until the anode voltage is removed. Since the voltage drop across tube 110 is very low after conduction starts, its cathode voltage becomes practically the same as the anode voltage. Since the resistance of the primary of transformer 114 is relatively low, the anode voltage of tube 110 will be almost equal to the voltage in line 58. Therefore the anode voltage of tube 104 suddenly increases when tube 110 fires. This causes a corresponding increase in current flow through tubes 104 and 110, resistance 96 and the primary of transformer 114, as shown in Figure 10, curve B. The increased current flow through resistance 96 causes a voltage drop which in turn causes a sudden rise in the cathode voltage of tube 98. This makes the grid 98G more negative with respect to its cathode 98C so that current flow therethrough is completely cut off. This in turn increases the voltage in line 180 to the value of the voltage in line 60, thereby increasing the positive voltage on grid 104G, which in turn allows still more current to flow through tubes 104 and 110 and the primary of transformer 114. Therefore, when the grid 98G reaches a certain critical value which causes tube 110 to fire, accumulated action is produced, which results in a sudden sharp increase in current in the primary of transformer 114 which in turn induces a positive impulse in the secondary of transformer 114, which impulse is the same in wave form, magnitude and duration regardless of the manner or speed of interruption of the light on the tube 14. The sudden voltage impulse in the secondary of transformer 114, as shown in curve C, Figure 10, is of such a polarity and amplitude as to make the voltage of line 118 positive with respect to the voltage of line 68 and also with respect to ground. Since the line 118 is connected to the grids 122G, 124G, 126G and 128G, these grids are driven positive with respect to their cathodes, but since tube 146 is the only one conducting at this time, only tube 122 of the control tubes has an anode voltage, which voltage is caused by the RI drop across resistance 130. Therefore, only tube 122 conducts. The anode current of tube 122 flows through the primary of transformer 138, inducing a voltage in such a direction as to make the grid 148G negative with respect to line 68. Since the grid 148G was already negative, it becomes still more negative so that the tube 148 cannot conduct (see curve E, Figure 10). When the current in the primary of transformer 114 builds up to its maximum value, it remains steady and constant as shown in curve B, Figure 10. This constant current flow induces no voltage in the secondary of the transformer (see curve C, Figure 10) so that the grid 122G will have its normal negative bias 118 which causes it to block the flow of current through tube 122. Therefore the current through the primary of transformer 138 drops to 0 (see curve D, Figure 10). This decreasing current through the primary of transformer 138 induces a positive voltage impulse on the grid 148G through the secondary of transformer 138 (see curve E, Figure 10). This positive impulse on grid 148G overcomes the normal bias 68 and causes the tube 148 to fire, thus closing the circuit through the stator coil 40—2 from line 56 to ground, thereby energizing stator coil 40—2 and causing the six nearest rotor poles to align themselves with the poles of stator coil 40—2 as described hereinbefore. At the instant the tube 148 fires, its anode becomes negative with respect to line 56 due to the RI drop in the stator coil 40—2 and since the anode of tube 146, which is also firing, is already negative with respect to line 56, its anode voltage is almost equal to its cathode voltage. Therefore, when tube 148 fires, its anode voltage drop is transmitted through condenser 186 to the anode 146A forcing it still further negative so that it becomes more negative than the cathode 146C. Tube 146 therefore stops firing and its grid regains control.

When the sheet S, being counted, moves out of the path of the light beam of the photocell 14, allowing the light to shine on the photocell, the grid 98G becomes sufficiently positive to overcome the voltage drop in resistance 96, thereby causing tube 98 to conduct. This causes line 180 and therefore the grid 104G to become more negative due to the RI drop in resistance 102. When the grid of tube 104 becomes sufficiently negative, the flow of current through tubes 104 and 110 ceases and the cathode 110C and the anode 104A have a voltage equal to that of line 58. The cathode of tube 110 is at a more positive potential than its grid. During the time the tubes 104 and 110 were ceasing to conduct, there was a decrease in current in the primary of transformer 114 (see curve B, Figure 10). This induces a voltage in the secondary of transformer 114 in such a direction as to make the line 118 and the grids of tube 122, 124, 126 and 128 more negative. Therefore, since these tubes were already biased to cut off, none of them will draw current or will be affected even though tube 124 has anode voltage applied. The control network is therefore in its original state of operational readiness to receive the next counting impulse which will energize stator coil 40—3 in the same sequence and manner as described above for stator coils 40—1 and 40—2. In other words, condenser 188 applied in the line between the anodes of tubes 148 and 150, condenser 189 applied in the line between the anodes of tubes 150 and 152, and condenser 190 applied in the line between the anodes of tubes 152 and 146 function in the same manner as condenser 186. Each counting impulse that follows will energize the stator coils in sequence as hereinbefore described, this resulting in a rotating field that produces rotation of the rotor 32. Condensers 191 in the grid cathode circuits of each of the thyratron tubes 146, 148, 150 and 152 lend stability to the operation of the circuit by acting as a by-pass for interfering voltage surges.

The rotation of the rotor shaft 18 is applied as follows to the indicating unit 16, which is shown in detail in Figures 5, 6 and 7. A plurality of plates 192, 194, 196 and 198 are held in spaced apart parallel relationship with stator plate 24 and with each other by means of threaded rods or bolts 200, 202, 204 and 206. The shaft 18 is connected to a clutch shaft 208 which passes through a bearing in the plate 192 with the top end of the shaft having a clutch disc 210 fixed thereto. A second clutch shaft 212 is supported in a ball bearing in plate 194. A corrugated clutch disc 214 is fixed to the lower end of the shaft 212 and is adapted to engage the disc 210. Immediately above the clutch disc 214 is the clutch operating lever 216 which has one end thereof connected to the plate 194 by means of a link 218. The other end of the lever 216 terminates adjacent the clutch magnet box 220 which is mounted on the plate 194. The armature 222 of the magnet box 220 has an adjustment screw 224 thereon for contacting the end of the lever 216. A spring 226 is connected to the bottom of the plate 194 and to the top of lever 216. Connected to the shaft 212 above the clutch lever 216 is the reset clutch disc 228. Directly above the clutch disc 228 is the clutch disc 229 which is fixed to the reset friction drive disc 230. A high speed shaft 232 extends downwardly through bearings in plate 194 and terminates in a disc 234. The shaft 232 surrounds the clutch shaft 212 and is keyed thereto by means of a sliding key 236. Attached to the top of the plate 194 is a rear collector ring assembly 238 having contactors 239 attached thereto. Directly above the collector ring 238 is a gear 240 having a high speed brush holder and microswitch base 242 attached thereto. Brushes 243 are carried by base 242 for contacting contactors 239. Members 238, 240, and 242 rotate in unison around the shaft 232 on ball bearings 244. A microswitch 246 is mounted on the plate 242 with its actuating lever 248 contacting the high speed cam 250 which is mounted on the shaft 232 for rotation therewith. A high speed stop cam 252 having a notch 253 therein is spaced a short distance from the high speed cam 250 and is adapted to operate a microswitch 254 through a lever 256. Microswitch 254 is fastened to the plate 196. Connected to the end of lever 256 adjacent switch 254 is one end of a spring 258, the other end being attached to the plate 196. Mounted in bearings 260, which are supported on top of the plate 196, and surrounding the shaft 232 is the slow speed reset friction drive disc 262. Directly above the reset disc 262 is a bearing 264. Mounted on the high speed shaft 232 is a pinion 266. The high speed shaft extends through the pinion and has a reduced diameter portion 268 which extends upwardly through the slow speed shaft 270 and terminates in a pointer 272. The slow speed shaft 270 has a gear 274 mounted on its lower end which is driven from the pinion 266 through a reduction gear 276 meshing with pinion 266 and a pinion 278 meshing with gear 274. The gear 276 and pinion 278 are attached to a shaft 280 which is supported by the bearing 260. A slow speed stop cam 282 having a notch 283 therein is mounted on the shaft 270 and actuates a microswitch 284 through the lever 286. The switch 284 is mounted on plate 196. One end of a spring 288 is fastened to the lever 286 with the other end being fastened to the plate 196. A warning signal contact cam 290 having a contact point 291 is mounted on the shaft 270 directly above cam 282 and is adapted to actuate a microswitch 292 which is mounted on plate 298. A package count contact cam 294 having a contact point 295 thereon is mounted on the shaft 270 above the cam 290 and is adapted to actuate a microswitch 296, which is mounted on the slow speed brush holder and microswitch base plate 298. Brushes 299 are supported by the plate 298. The plate 298 is attached to a gear 300 and to a Micarta cylinder 302. The plate 298, gear 300 and cylinder 302 rotate around the shaft 270 on ball bearings 304. Supported by plate 198 is a shaft 306 having a package count register 308, package reset gear 310 and package selector gear 312 fastened thereto, the gear 312 meshing with the gear 300. The gears 300, 310 and 312 are all the same size. A pinion 314 on shaft 270 meshes with gear 310. Fastened to the pinion 314 is an intermediate idler gear 316 which meshes with a pinion 318 mounted on a shaft 320 which is supported by the plate 198. Also mounted on the shaft 320 is a sheet count register dial 322, zero contact cam 324 having a notch 325 therein, sheet count selector gear 326 and sheet count correction ratchet 328. The cam 324 is adapted to actuate a microswitch 330. Attached to the under side of the plate 198 is the front collector ring assembly 332. Contacts 333 for the brushes 299 are supported in ring assembly 332. The brushes 243 and 299 contact the contacts 239 and 333, respectively, to deliver current from the rotating to non-rotating parts. The slow speed shaft 270 extends upwardly through the plate 198 and has the slow speed pointer 334 attached thereto. Extending downwardly through plates 198 and 196 is a selector knob shaft 336 having a count selector knob 338 at the top thereof. A selector pinion 340 attached to shaft 336 engages the gear 326 and a second selector pinion 342, also attached to shaft 336, engages a gear 344 which is mounted on a shaft 346 supported by the plate 194. The gear 344 meshes with the gear 240. Mounted adjacent the sheet count correction ratchet 328 is a count correction magnet box 348 having a ratchet arm 350 adapted to engage the ratchet 328. A ratchet positioning plunger 352 is mounted adjacent the ratchet 328. Mounted between the rear plate 194 and the intermediate plate 196 and supported by the plates is a reset motor 354 having a shaft 356 extending from both sides thereof. Fastened to the lower end of the shaft 356 below plate 194 are the discs 358 which frictionally drive the disc 230. The other end of shaft 356 extends upwardly through the plate 196 with discs 360 being mounted on the top thereof. The discs 360 frictionally drive the disc 262.

The pointer 272 cooperates with a dial 362 which is divided into 112 graduations. The pointer 334 cooperates with a dial 364 which is divided into 16 graduations. The package count register or dial 308 is partially visible through an opening 366 in the plate 198. An indicator mark 368 extends into the opening 366. The sheet count register or dial 322 is likewise visible through an opening 370 in the plate 198, the opening being provided with an indicating mark 372.

The operation of the device is as follows:

The high speed hand 272 is arranged so that it points to zero and the sheet count register dial 322 is arranged so that zero appears under the indicator mark 372. The package count register dial 308 is arranged so that zero appears under the indicator mark 368. Zero contact cam 324 is arranged to position the roller at the end of its contact arm 331 in the notch 325 of the cam 324, which is then fastened to the shaft 320. Package count contact cam 294 is rotated about shaft 270 until its contact point 295 contacts the roller at the end of the contact arm of the microswitch 296 and the cam 294 is then fixed to the shaft 270. Warning signal contact cam 290 is rotated until its contact point 291 trips microswitch 292 and it is then advanced slightly past the contact point toward microswitch 296 in the direction that the shaft 270 rotates during operation. The cam 290 is then fastened securely to the shaft 270. This setting can be varied as desired so that the warning signal will operate at the desired number of sheets prior to the completion of a bundle. Assuming that there are 12 packages in a bundle, the count selector knob 338 is turned until the indicator mark 368 is opposite the number 12 and the indicator mark 372 is opposite zero. As the knob 338 is turned, the dial 322 is rotated by the pinion 340 through the gear 326. At the same time pinion 318 on shaft 320 rotates the idler gear 316 and the pinion 314 in turn rotates the gear 310 and dial 308. The arrangement of this gearing is such that when the dial 322 has been rotated one complete revolution, the dial 308 will have rotated one-sixteenth of a revolution or one package graduation. The gear 312 rotates gear 300 in a one to one ratio so that the microswitches 292 and 296 will rotate about the periphery of the cams 290 and 294 one-sixteenth of a revolution. This advances the sheet register 322 one revolution or 112 sheets and the package register one-sixteenth of a revolution or one package. Selector pinions 340 and 342 are identical and rotate simultaneously with the shaft 336. Thus the gear 240 and base 242 are giving the same angular movement as sheet count register 322. Thus when the sheet count register is advanced one graduation or $1/112$ of a revolution, the microswitch 246 is also rotated or advanced about sheet count cam 250 $1/12$ of a revolution. With the counter set up in this manner, it is ready for operation.

Every time a sheet S passes under the photoelectric cell 14, the rotor shaft 18 rotates $1/112$ of a revolution in the manner described above. With the clutch faces 210 and 214 in engagement, the high speed shaft 232 and low speed shaft 270 are rotated in the manner described hereinbefore, thus causing the high speed pointer 272 to move one graduation and the low speed pointer 334 to move $1/112$ of a graduation. The various cams fastened to the shaft will likewise move at the same speed as the corresponding shaft, the high speed shaft turning at 16 times the speed of the low speed shaft. The cam 250 actuates microswitch 246 on every revolution when the roller at the end of the actuating lever 248 is contacted by the contact point on cam 250. This occurs when the sheet count hand 272 passes 0. This alone causes no reaction since the microswitch 246 is in series with microswitch 296. High speed cam lever 256 rides on the periphery of cam 252 dropping into the notch 253 in the cam 252 on each complete revolution as the sheet count hand 272 passes through 0. When the reset mechanism operates to turn shaft 232 in the opposite direction, the stop cam 252 will permit rotation only to the point where the sheet count hand 272 is at 0. Thus the function of this cam is to always stop the sheet count hand on 0 when the counter is reset. Stop lever 256 opens the microswitch 254 during reset operation only when the hand 272 is on 0. The function of cam 282 is the same as that of cam 252 except that it works on the package count mechanism. The lever 286 functions in a manner similar to that of lever 256, that is, it opens the microswitch 284 during reset operation only when hand 272 is on 0. The warning signal cam 290 will close microswitch 292 a short time (for example, 60 sheets) before the bundle is completed. The cam 294 will close microswitch 296 when the package count hand 334 reads 12 packages on the dial and the sheet count hand 272 reads 0. At this time switches 246 and 296 will both be closed. Since microswitches 254 and 284 are closed at all times except when the hands 272 and 334 are on 0 and the reset motor 354 is attempting to turn the shafts 232 and 270 in reverse direction these switches will also be closed. The closing of the four switches actuates an electrical relay and causes the following actions to take place simultaneously. The clutch magnet 220 is actuated, thus disengaging disc 210 and 214 and engaging discs 228 and 229. The reset motor 354 is started in operation, thus rotating the shafts 232 and 270 in reverse direction through the friction drives 358 and 360. The high speed shaft 232 returns the sheet count hand 272 to 0 and the notch 253 in high speed stop cam 252 engages stop lever 256 so that the reverse rotation of shaft 232 causes the lever 256 to open the microswitch 254 and hold the hand 272 on 0. At the same time the slow speed shaft 270 is rotated to return the package count hand 334 to 0. The hand 334 and slow speed stop cam 282 rotate until the slow speed stop cam lever 286 drops into the notch 283 in cam 282, at which time the reverse rotation of cam 282 causes the lever 286 to open the microswitch 284, thus stopping rotation of cam 282 and holding the hand 334 on 0. The flap gate 4 is also operated to divert sheets S into the mender piler 6. Since microswitches 254 and 284 both are open they will break the electric circuit to stop the reset motor 354, release the clutch magnet 220 to position the clutch in normal drive and return the flap gate to normal position. The counter mechanism is now ready to start a new bundle.

In some instances sheets are removed from the system after passing the count actuating electric eye 14. Means are provided for correcting for the removal of these sheets without effecting the operation of the counter. Assuming that 8 sheets have been removed after passing the count actuating device, the bundle would be 8 sheets short unless this is compensated for. In order to compensate for the removal of 8 sheets the count selector knob 338 is turned clockwise to position the sheet count register 322 so that the figure 8 appears under the indicator mark 372. In doing this the various cams and switches are moved in the manner described hereinbefore so that contact of the switches 246, 292 and 296 with their respective cams will not take place until 8 sheets in addition to those for which the counter was originally set up for have passed photoelectric cell 14.

In case 8 sheets are manually added to the bundle, the count selector knob 338 will be turned counterclockwise until the sheet count register 322 is positioned with the figure 104 under the indicator 372. In other words, the cams and switches are moved so that contact of the switches with their respective cams will take place 8 sheets in advance of the predetermined normal count.

The wiring diagram for carrying out the above described operation is shown schematically in Figure 9. Power is supplied to the circuit through lines 374. Shortly before the sheet count is completed switch 292 closes completing the circuit to light 376, thus warning the operator that it will soon be time to place a separator on top of the completed bundle. When the count is completed switches 246 and 296 are both closed and switch 284, which is closed at all times except when the package count is on 0, will also be closed, thus completing the circuit through relay coil 378. When relay coil 378 is energized the seven contacts thereof are closed. Closing of contact 378—1 closes the circuit through the gong 380 thus warning the operator that the count has been completed. Closing of contact 378—2 completes the circuit through the clutch coil 220, thus disconnecting the drive from shaft 18 and connecting the drive from the reset motor 354. Closing of contact 378—3 closes the contact through the reset motor 354. Closing contact 378—4 enables the circuit through switches 254 and 284 to remain closed even though the switches 296 and 246 open. Closing of contact 378—5 completes the circuit to the flap gate solenoid 382 which actuates the flap gate 4 to enable the sheets to go to the reject piler. Closing of contacts 378—6 completes a circuit in the time delay relay to be described hereinafter.

The time delay relay includes the primary of a transformer 384 connected to power source 374. The voltage of the secondary of transformer 384 is rectified by the action of rectifier 388. The rectified output is then filtered by the capacitor 386 and resistors 390, 392 and 394 so that there is a steady D. C. voltage across this parallel capacitor resistance combination. This voltage is marked E—1. A tachometer generator 396 is mechanically coupled to the conveyor line so that its D. C. voltage output is directly proportional to the speed of the conveyor line. A potentiometer 398 is connected across the terminals of the tachometer generator. E—2 is the voltage from the variable arm to the ground end of the potentiometer. As the tachometer generator output voltage is directly proportional to the speed of the conveyor the voltage E—2 is proportional to the conveyor's speed. E—3 is the voltage as measured from the variable arm of potentiometer 392 to the negative end of resistance 390. The value of E—3 may, of course, be varied by changing the position of the arm of the potentiometer 392. E—4 is the instantaneous voltage across the parallel combination of resistance 400 and condenser 402. Normally when contacts 378—6 are open voltage E—4 is zero. When contacts 378—6 are closed the condenser 402 charges up to equal voltage E—1 and the instantaneous value of E—4 will, of course, equal E—1. The grid bias voltage E—5 on tube 404 is equal to E—4 minus E—3 minus E—2. At this time E—4 will overcome the negative bias between the grid and cathode 404C of tube 404 thus allowing the tube to conduct. This energizes relay coil 406 closing contacts 408 and completing a parallel circuit to solenoid 382 from the A. C. power source 374. This circuit remains closed even when contacts 378—5 open. As soon as contacts 378—6 open the condenser 402 will begin to discharge through resistance 400. As the condenser discharges the value of E—4 will decrease exponentially until the voltage E—5 becomes negative again, at which time tube 404 ceases conducting causing contacts 408 to open so that the flap gate 4 returns to its normal position. If the conveyor line is speeded up E—2 becomes larger so that E—5 will reach the cut-off value at a larger value of E—4. Thus it would take less time after the opening of contact 378—6 for the tube 404 to be cut-off. If the line is slowed down the bias voltage E—2 is decreased so that positive voltage E—4 would be able to decay to a smaller value before the tube 404 is cut off. This means that there is a longer period of time for coil 406 to be energized. Thus it will be seen that I have devised a time-delay relay in which the time varies inversely in proportion to the speed of the conveyor thus enabling the same number of sheets to go to the reject piler regardless of the speed of the line. This delay enables the operator to place a separator on top of the completed bundle preparatory to beginning a new bundle.

When sheets have been added or subtracted in the manner hereinbefore described, switch 330 will be closed completing a circuit through the coil 412 when contacts 378—7 are closed. This completes the circuit through the bell 414 which rings, warning the operator to correct the setting on the counter. Energization of coil 412 closes contacts 412—1 which completes an alternate circuit through the bell 414 so that the bell continues to ring even after contacts 378—7 open. The bell 414 will continue to ring until the operator corrects the setting on the counter which opens switch 330.

For purpose of convenience the correction for sheets taken away after passing the photoelectric cell 14 may be made from a remote position by providing a push button switch 416 which closes a circuit to the count correction ratchet coil 418 which actuates the ratchet positioning plunger 352. Each time the switch 416 is closed, the plunger 352 will turn the ratchet 328 to correct for 1 sheet.

While one embodiment of my invention has been shown and described, it will be apparent that other adaptations and modifications may be made without departing from the scope of the following claims.

I claim:

1. A step-by-step motor comprising a rotor, a plurality of equally spaced poles mounted on said rotor, and a plurality of stator pole segments grouped around the periphery of said rotor, each stator pole segment having a plurality of equally spaced poles mounted thereon, said stator pole segments being unequally spaced from each other.

2. A step-by-step motor comprising a shaft, a rotor mounted on said shaft, a plurality of equally spaced poles mounted on said rotor, and a plurality of stator pole segments grouped around the periphery of said rotor, said stator pole segments being unequally spaced from each other.

3. A step-by-step motor according to claim 2 in which each stator pole segment has a plurality of equally spaced poles mounted thereon.

4. A step-by-step motor according to claim 2 in which there is a drag plate mounted on said rotor shaft and a brake brush bearing on said drag plate.

5. A step-by-step motor according to claim 4 in which each stator pole segment has a plurality of equally spaced poles mounted thereon.

6. Apparatus for counting moving sheets comprising a shaft, a rotor mounted on said shaft, a plurality of equally spaced poles mounted on said rotor, a plurality of stator pole segments grouped around the periphery of said rotor, said stator pole segments being unequally spaced from each other, a photoelectric tube in the path of travel of said sheets, a coil for each of said stator pole segments, a thyratron tube connected in series with the coil of each of said stator pole segments, said thyratron tubes energizing said stator pole segments when fired, means actuated by said photoelectric tube for successively firing said thyratron tubes each time a sheet cuts off the light to said photoelectric tube, and a counter actuated by said shaft each time a stator pole segment is energized.

JAMES B. CAMP.

REFERENCES CITED

The following references are of record in the file of this patent:

UNITED STATES PATENTS

| Number | Name | Date |
|---|---|---|
| 1,266,388 | Bergman | May 14, 1918 |
| 1,405,502 | Dodds | Feb. 7, 1922 |
| 1,492,913 | Wood | May 6, 1924 |
| 1,533,647 | Hall | Apr. 14, 1925 |
| 1,741,387 | Waitkus | Dec. 31, 1929 |
| 1,890,752 | Sanford | Dec. 13, 1932 |
| 1,924,624 | Roesen | Aug. 29, 1933 |
| 2,059,398 | Roemer | Nov. 3, 1936 |
| 2,099,065 | Holden | Nov. 16, 1937 |
| 2,116,785 | Griffith | May 10, 1938 |
| 2,122,710 | Bidwell et al. | July 5, 1938 |
| 2,133,262 | Wolff | Oct. 11, 1938 |
| 2,164,633 | Barrett | July 4, 1939 |
| 2,169,100 | Lange | Aug. 8, 1939 |
| 2,246,516 | Herzog | June 24, 1941 |
| 2,340,743 | Griffith | Feb. 1, 1944 |
| 2,342,753 | Pearson et al. | Feb. 29, 1944 |
| 2,371,268 | Schofield | Mar. 13, 1945 |
| 2,382,847 | Baumann | Aug. 14, 1945 |
| 2,389,458 | Preston | Nov. 20, 1945 |
| 2,412,571 | Few | Dec. 17, 1946 |
| 2,415,854 | Sheffield | Feb. 18, 1947 |
| 2,428,882 | Kolff | Oct. 14, 1947 |
| 2,463,318 | Schneider et al. | Mar. 1, 1949 |
| 2,507,798 | Maxwell | May 16, 1950 |

FOREIGN PATENTS

| Number | Country | Date |
|---|---|---|
| 727,870 | France | June 25, 1932 |